United States Patent [19]

Feagin

[11] Patent Number: 4,740,246

[45] Date of Patent: Apr. 26, 1988

[54] CASTING OF REACTIVE METALS INTO CERAMIC MOLDS

[75] Inventor: Roy C. Feagin, Boca Raton, Fla.

[73] Assignee: Remet Corporation, Chadwicks, N.Y.

[21] Appl. No.: 933,838

[22] Filed: Nov. 24, 1986

Related U.S. Application Data

[63] Continuation of Ser. No. 741,661, Jun. 6, 1985, abandoned.

[51] Int. Cl.$^4$ .......................... B28B 7/36; C04B 35/68
[52] U.S. Cl. ................................ 106/38.22; 501/105; 501/152
[58] Field of Search ..................... 252/313.1; 501/152, 501/105; 106/38.22

[56] References Cited

U.S. PATENT DOCUMENTS 3,537,949 11/1970 Brown et al. .
4,040,845 8/1977 Richerson et al. ................. 106/38.9
4,240,828 12/1980 Huseby ................................. 75/135
4,415,673 11/1983 Feagin ................................. 501/105
4,504,591 3/1985 Feagin ................................. 501/105

OTHER PUBLICATIONS

Borom, M. P., "Dissolution of Single & Mixed Oxides of Y, La, Al and Mg in Aqueous Caustic 838 American Ceramic Society Bulletin, vol. 61, (1982).

Primary Examiner—Theodore Morris
Attorney, Agent, or Firm—Beveridge, DeGrandi & Weilacher

[57] ABSTRACT

Mold coatings that are relatively unreactive with titanium and titanium alloys during casting are prepared from zirconia or yttria sols, or mixtures thereof as a binder for a refractory such as zirconium oxide, yttrium oxide and mixtures thereof.

12 Claims, 4 Drawing Sheets

CASTING OF REACTIVE METALS INTO CERAMIC MOLDS

REFERENCE TO A RELATED APPLICATION

This is a continuation of my copending application Ser. No. 741,661, filed June 6, 1985, now abandoned the entire disclosure of which is incorporated by reference herewith.

INTRODUCTION AND BACKGROUND

The present invention relates, in one aspect, to yttria sol used as a binder for a wide variety of refractory materials, casting molds, core molds, related compositions and processes, and the casting of reactive metals into ceramic molds. More particularly, the invention pertains to the use of yttria sol as a bonding agent for refractory materials in making the first cost of a ceramic mold for casting of reactive metals such as titanium and titanium alloys. Backup coating compositions may be any of the compatible system known in the art.

Molds produced in accordance with the present invention are particularly useful because they enable the casting of reactive metals with minimized or essentially no alpha case. The present invention results in lower alpha case than is obtainable with conventional molds utilizing other binders previously used in the art. Methods of forming casting molds and core molds are encompassed by the present invention.

In another aspect, the present invention pertains to the use of zirconia sol with selected refractory materials; namely, fused yttrium oxide, or mixtures of fused yttrium oxide and fused zirconium oxide, and the formation of coating compositions therewith and methods of forming molds utilizing same.

For the past 25 years, considerable effort has been devoted to providing capability for casting reactive metals, particularly titanium and its alloys, into ceramic molds. This development and the interest in providing such capability resulted from the interest and activity in the nuclear and aircraft industries where it was necessary to search for high strength and lightweight metals. Since the strength to weight ratio for titanium is very high, use in the aircraft industry was a logical development.

The melting point of titanium metal is almost 3100° F. and reacts in the molten condition with most refractories. Earlier attempts to cast titanium into ordinary foundry molds were unsuccessful due to the undesirable chemical reactions between the hot metal and the surfaces with which it came into contact. For example, reduction of the silica produced heavy reaction zones on the casting surface and oxide inclusions. This reaction layer is known in the industry as "alpha case". Problems of alpha case have been described in detail in the literature. Machined and formed graphite molds have been used commercially to make titanium castings. Such molds can be made in such a way as to minimize the alpha case layer. The U.S. Bureau of Mines activities have continued for almost 25 years on the casting of refractory metals. However, there have been continuing efforts to search for other materials and methods to reduce or eliminate alpha case.

The use of graphite in investment molds has been described in the art in such patents as U.S. Pat. Nos. 3,241,200; 3,243,733; 3,256,574; 3,266,106; 3,296,666 and 3,321,005 all to Lirones. Other prior art which show a carbonaceous mold surface utilizing graphite powders and finely divided inorganic powders called "stuccos" are Operhall, U.S. Pat. Nos. 3,257,692; Zusman et al., 3,485,288 and Morozov et al., 3,389,743. These documents describe various ways of obtaining a carbonaceous mold surface by incorporating graphite powders and stuccos, various organic and inorganic binder systems such as colloidal silica, colloidal graphite, synthetic resin which are intended to reduce to carbon during burnout, and carbon coated refractory mold surfaces. These systems were observed to have the disadvantage of the necessity for eliminating oxygen during burnout, a limitation on the mold temperature and a titanium carbon reaction zone formed on the casting surface.

Further developments including variations in foundry molds are shown in Turner et al., U.S. Pat. No. 3,802,902 which uses sodium silicate bonded graphite and/or olivine which was then coated with a relatively non-reactive coating such as alumina. However, this system still did not produce a casting surface free of contamination.

Schneider, U.S. Pat. No. 3,815,658 shows molds which are less reactive to steels and steel alloys containing high chromium, titanium and aluminum contents in which a mangnesium oxide-forsterite composition is used as the mold surface A number of attempts have been made in the past to coat the graphite and the ceramic molds with materials which would not react with the reactive metals being casted. For example, metallic powders such as tantalum, molybdenum, columbium, tungsten, and also thorium oxide had been used as non-reactive mold surfaces with some type of oxide bond. See Brown, U.S. Pat. Nos. 3,422,880; 3,537,949 and 3,994,346.

Operhall, U.S. Pat. No. 2,806,271 shows coating a pattern material with a continuous layer of the metal to be cast, backed up with a high heat conductivity metal layer and investing in mold material.

Basche, U.S. Pat. No. 4,135,030 shows impregnation of a standard ceramic shell mold with a tungsten compound and firing in a reducing atmosphere such as hydrogen to convert the tungsten compound to metallic tungsten or tungsten oxides. These molds are said to be less reactive to molten titanium but they still have the oxide problems associated with them.

Brown, U.S. Pat. No. 4,057,433 discloses the use of fluorides and oxyfluorides of the metals of Group IIIa and the lanthanide and actinide series of Group IIIb of the Periodic Chart as constituents of the mold surface to minimize reaction with molten titanium. This reference also shows incorporation of metal particles of one or more refractory metal powders as a heat sink material. However, even those procedures have resulted in some alpha case problems.

A development by General Electric has provided barrier layers of refractory oxide in a silica bonded mold for casting alloys containing significant amounts of reactive metals; see Gigliotti et al. U.S. Pat. Nos. 3,955,616; 3,972,367 and 4,031,945.

Huseby, U.S. Pat. No. 4,240,828 shows casting a super alloy (containing nickel and cobalt) material containing reactive metals into a ceramic mold containing a rare earth dopant in the alloy.

In the 1960's, developments at Wright Air Development Center led to the formation of a crucible for melting titanium formed from a titanium enriched zirconium oxide crucible with less reaction to molten titanium than pure zirconium oxide.

Richerson, U.S. Pat. No. 4,040,845 shows a ceramic composition for crucibles and molds containing a major amount of yttrium oxide and a minor amount of a heavy rare earth mixed oxide. Such methods including the making of a titanium metal enriched yttrium oxide were only partially successful because of the elaborate expensive and technique which required repetitive steps.

Molds for casting molybdenum made from zirconium acetate bonded calcia stabilized zirconium oxide have been made by the Bureau of Mines.

Feagin, U.S. Pat. No. 4,415,673 has reported on the zirconia binder which is an aqueous acidic zirconia sol used as a bond for an active refractory including stabilized zirconia oxide thereby causing reaction and gelation of the sols. Solid molds were made for casting depleted uranium. A distinction is made in this patent between "active" refractories and refractories which are relatively inert. The compositions of Feagin are intended to contain at least a portion of active refractories. See also Feagin, U.S. Pat. No. 4,504,591.

In summary, the following are four of the processes used for the production of molds for titanium casting and can be set forth as follows:

1. Graphite mold coated with a tungsten powder and a silica binder.

2. A silica binder prepared either from ethyl silicate, aqueous colloidal silica or the like, used to bond thorium oxide for a first coating on a wax pattern. This is then backed up with silica bonded lower cost refractory coatings and stuccos to complete the mold.

3. A zirconium acetate bonded zirconia refractory is used for a first coating. Setting or gelling taken place immediately after application in an atmosphere of ammonia. After drying, this is backed up with a lower cost silica bonded refractory coating to complete the shell mold.

4. A colloidal silica bonded stabilized zirconium oxide ($ZrO_2$) refractory is used to form the first coat of a mold and this is backed up with a lower cost silica bonded refractory coating to complete the shell mold.

It is generally recognized in the industry that all commercial processes have some alpha case on their casting. This may range from about 0.005 inches to 0.04 inches in thickness depending on process and casting size. The alpha case must be milled off by chemical means or other means from the casting before a satisfactory casting is obtained. The extra cost imposed by the chemical milling operation is a disadvantage and presents a serious problem from the standpoint of accuracy of dimensions. Normally, the tooling must take into consideration the chemical milling which results in the removal of some of the material in order to produce a casting that is dimensionally correct. However, since casting conditions vary, the alpha case will vary along the surface of the casting. This means that there is a considerable problem with regard to dimensional variation.

SUMMARY OF THE INVENTION

The present invention pertains to yttria sols and the use of these materials as binders for refractories, and particularly zirconium oxide and/or yttrium oxide, or blends thereof, or fused zirconium oxide and/or fused yttrium oxide or blends thereof as a refractory component in making a mold coating composition consisting essentially of those ingredients. The invention further relates to the reactive compositions of the sols and the refractory material and the mold coatings and cast shapes prepared therefrom. The invention also pertains to the method of making the coating compositions and methods of making molds. Of particular interest is the method of casting titanium and titanium alloys such as Ti6A14V and the reduction of alpha case which is brought about by the present invention.

In a further aspect of the invention, the invention pertains particularly to coatings and molds for metal casting, and to the use of ytrria sol as a binder for a variety of refractories, metal powders, and fibers for various application.

Still further, the invention includes within its ambit the use of zirconia sol with a selected group of refractory substances, the formation of coating compositions therefrom and the production of casting surfaces therewith.

An object of the invention is to provide a composition suitable for making a mold coating which is less reactive with titanium and titanium alloys during casting.

Another object of the invention is to provide a low reactivity mold coating for reactive metal casting.

A further object of the invention is to provide a ceramic mold having a casting surface having low reactivity with reactive metals.

A still further object of the present invention is to provide a process for making an investment casting mold having low reactivity with reactive metals.

A further object of the invention is to provide a ceramic core with a relatively reaction-free surface against which metals may be poured.

Yet another object of the invention is to provide a castable refractory composition, using yttria sol as the binder, and the resulting ceramic body.

A still further object of the present invention is to provide a process for making an investment casting mold having low reactivity with molten titanium, titanium alloys, zirconium and zirconium alloys.

A further object of the present invention is to provide a coating composition suitable for spraying or painting of a foundry mold, melting crucible, ladle, or pouring basin to make it resistant to reactive metals.

Finally, it is a further object of the present invention to provide certain compositions and processes utilizing zirconia sols and to obtain novel product therewith.

By the term "reactive metals" is meant those metals and alloys which may react with or produce a relatively rough mold surface when poured into ordinary investment casting molds having mold surfaces containing one or more of the following refractories: silica, alumina, aluminosilicates, zirconium silicate (zircon) or other oxides and mixed oxides normally used in investment casting molds. Examples of these reactive metals are titanium, titanium alloys such as Ti6A14V, zirconium, zirconium alloys, high carbon steels, eutectic alloys (containing appreciable amounts of tungsten, hafnium, carbon, nickel, cobalt, etc.), aluminum-lithium alloys, nickel base alloys containing appreciable amounts of titanium or aluminum or hafnium or tungsten. One of the most reactive of all of these metals is titanium. These terms are fully discussed in Feagin, U.S. Pat. Nos. 4,415,673 and 4,504,591 which are incorporated herein by reference.

It is therefore a feature of the invention to provide a refractory composition comprising yttria sol and any compatible finely divided, hardenable refractory binder substance. In particular, these compositions are coating compositions comprising a refractory material selected from the group consisting of yttrium oxide, zirconium oxide, fused yttrium oxide, fused zirconium oxide, monoclinic zirconium oxide, yttrium oxide, cubic zirconium oxide, fused stabilized zirconium oxide having as the stabilizing agent a member selected from the group consisting of calcium oxide, magnesium oxide, yttrium oxide, lanthanum oxide, dysoprosium oxide, and other rare earth oxides, blends of zirconium and yttrium oxides or with other constituents in this group, and fused blends of zirconium and/or yttrium oxide with other rare earth oxides, and mixtures of any of the above, and a sufficient amount of a yttria sol binder.

In a further aspect, the invention resides in a process for making an investment casting mold having low reactivity with reactive metals comprising providing a ytrria sol, mixing said sol with any of the above-mentioned refractory materials, including but not limited to yttrium oxide, zirconium oxide, fused yttrium oxide, fused zirconium oxide and mixtures thereof, to form a coating composition, applying said coating composition to a pattern shaped in the desired configuration, heating the resulting coated pattern to a sufficiently high temperature to melt or burn out the pattern material, and thereby sintering said coating composition into the desired shape.

Among the suitable refractory materials are monoclinic zirconium oxide, yttrium oxide, cubic zirconium oxide, fused stabilized zirconium oxide having as the stabilizing agent from the group consisting of calcium oxide, magnesium oxide, yttrium oxide, lanthanum oxide, dysprosium oxide, and other rare earth oxides. blends of zirconium and yttrium oxides or with other constituents in this group, and fused blends of zirconium and/or yttrium oxide with other rare earth oxides.

A still further feature of the invention resides in a process for making a ceramic core comprising coating the inside of a core mold with a slurry comprising yttria sol and any of the above-mentioned refractory materials, including but not limited to yttrium oxide, zirconium oxide, fused yttrium oxide and a mixture of fused yttrium oxide and zirconium oxide and others, and before the coating is dry applying thereto finely divided refractory and permitting the coating to dry, thereafter applying to the coating a mixture of a refractory and a binder therefor removing the core from the mold and firing said core at a sufficiently high temperature to bond the coating and the silica refractory.

Also, a further feature of the invention resides in a process for casting a reactive metal in a mold having low reactivity with reactive metals comprising providing a yttria sol, mixing said sol with a refractory material to form a coating composition, applying said coating composition to a pattern shaped in the desired configuration, allowing the coating to gel, heating the resulting coated pattern to a sufficiently high temperature to melt or burn out the pattern material, thereby fusing said coating composition into the desired shape, thereafter casting said metal into the mold.

It is a further feature of the invention to provide refractory compositions comprising zirconia sol and a refractory selected from the group consisting of fused yttrium oxide, fused zirconium oxide and mixtures thereof.

In a further aspect, the invention resides in a process for making an investment casting mold having low reactivity with reactive metals comprising providing a zirconia sol, mixing said sol with a refractory material related from the group consisting of fused yttrium oxide, fused zirconium oxide and mixtures thereof, to form a coating composition, applying said coating composition to a pattern shaped in the desired configuration, heating the resulting coated pattern to a sufficiently high temperature to melt or burn out the pattern material, and thereby sintering said coating compression into the desired shape.

A still further feature of the invention resides in a process for making a ceramic core comprising coating the inside of a core mold with a slurry comprising zirconia sol and a refractory material selected from the group consisting of fused yttrium oxide, fused zirconium oxide and a mixture of fused yttrium oxide and fused zirconium oxide, and before the coating is dry applying thereto finely divided refractory and permitting the coating to dry, thereafter applying to the coating a mixture of a refractory and a binder therefor and permitting this mixture to gel to form a core, thereafter removing the core from the mold and firing said core at a sufficiently high temperature to bond the coating and the silica refractory.

DETAILED DESCRIPTION OF THE INVENTION

The binders used for the experiments described herein were aqueous, although non-aqueous sols can be used. Organic solvents, for example an alcohol, may be utilized but these are much more difficult to produce and are necessarily more costly.

The yttria sol used in these experiments has a pH of approximately 6.5–7 and a concentration of preferably 14% $Y_2O_3$, although this can vary as well as the pH.

TABLE 1

| Typical Physical and Chemical Properties Yttria Sol | |
|---|---|
| Color | almost colorless, transparent |
| pH, 25° C. | 6.5–7.0 |
| Particle Size, mμ | 10 |
| Particle Charge | Positive |
| Specific Gravity, 25° C. | 1.17 |
| Weight %, yttrium oxide | 14 |
| Viscosity, cps. | 10 |
| Shelf life | At least six months |
| Dilution with water | Yes |
| Subject to freezing | Freeze-Thaw Stable |

The zirconia sol used in the work reported herein was from various lots containing approximately 20% $ZrO_2$ and having a pH of approximately 3–3.7 and was acetate stabilized. However, other types of zirconia sols may be used such as nitrate stabilized sols. Other stabilized sols in lower pH ranges may also be used even as low as 0.5 pH. It is more desirable to use a low reactivity stabilizer and a pH higher than 3 to minimize the safety hazard of handling the more acidic material.

The following table shows the physical properties of the zirconia sol. The color is very slightly amber for both sols shown on the table. The pH is quite different which the acetate stabilized being at about 3.6–4 and the nitrate stabilized being at less than 2. The specific gravity is different in the two types because of the stabilizing ions. The particle size of the zirconia particle is in the range of about 20 Angstroms (0.002 micron). The zirconia particles have a positive charge. The viscosity is low, with the composition being slightly thicker than water. Although the sol will freeze, they are freeze-thaw stable.

TABLE 2

| Typical Physical Properties Zirconia Sols | Acetate Stabilized | Nitrate Stabilized |
|---|---|---|
| Color | slightly amber | slightly amber |
| pH, 25° C. | 3.0–3.6 | 0.3–0.5 |
| Specific Gravity 25° C. (20% $ZrO_2$) | 1.26 | 1.32 |
| Particle Size (microns) | 5–10 | 5–10 |
| Electrical Charge on Particles | Positive | Positive |
| Viscosity, centipoise, 20° C. | 10 | 8 |
| Shelf Life | over 1 yr. | over 1 yr. |
| Dilution with water | yes | yes |
| Subject to Freezing | 5–10 | 5–10 |

Table 2 shows the chemical properties of the zirconia sols. A typical $ZrO_2$ content is 20% in each case. Due to the fact that hafnia is generally present in most commercial zirconia, it is present in approximately 0.4% in the sol used for purposes of this invention. However, it is not considered an essential ingredient. The sodium content is approximately 0.04% and approximately 0.05% iron. Calcium plus magnesium is less than 0.04%. As noted, the stabilizing ion in both products is $1\pm0.2$ mole of stabilizing ion per mole of $ZrO_2$. This varies slightly depending upon the exact pH and the exact percent $ZrO_2$. Shelf life of these products is over one year and they can be diluted with water to any concentration desired. These sols will gel or precipitate $ZrO_2$ upon addition of alkalis or multivalent ions such as sulfate or phosphate.

In general, concentrations of the oxides in the sols can be varied higher or lower depending upon other factors in the process such as composition of the coating, type of refractory used, particle size of the refractory and mold firing conditions.

For purposes of the present invention, refractory powders or aggregate suitable for use in the mold coatings or for the casting surface of a mold or for a melting crucible are those of the following group: monoclinic zirconium oxide, yttrium oxide, cubic zirconium oxide, fused yttrium oxide, fused zirconium oxide, fused stabilized zirconium oxide having as the stabilizing agent a member from the group of calcium oxide, magnesium oxide, yttrium oxide, lanthanum oxide, dysprosium oxide and other rare earth oxides, blends of zirconium and yttrium oxides or with other constituents in this group and fused blends of zirconium and/or yttrium oxide with other rare earth oxides.

These may be used with the yttria sols, or mixtures of one or more thereof may be used. When zirconia sol is used, either fused yttrium oxide or fused zirconia oxide a mixture of fused yttrium oxide and fused zirconium oxide may be used.

It has been found that zirconium oxide or calcium or magnesium oxide stabilized (2.0–4.0% CaO or MgO) zirconium oxide mixed with zirconia sol as the binder and used as the first coating of an investment cast shell mold, produces an alpha case of approximately 0.020–0.025" thick using a Ti6A14V alloy poured into a mold at 1000° F. Mold surfaces using fused mixtures of zirconium and yttrium oxides had lower alpha case, and a mold surface comprising a high content of yttrium oxide showed very low alpha case.

In preparing molds for casting in Ti6A14V alloy a number of pattern wax bars approximately ⅜" diameter were cut into lengths (fingers) about 5" long. The first coating to form the mold surface was applied to a 4" portion of this finger, leaving about one inch uncoated. The application of the coating was by dipping the finger into the slurry or spraying the coating on to the wax finger. While it was still wet, the stucco was applied. The coated finger was then allowed to dry. After all, the wax fingers were coated, stuccoed and dried, they were attached by wax sealing the uncoated end to a wax pouring funnel about 4" diameter and 4" high with a flat base at the small end. Four or five fingers were attached to each funnel.

After sealing the wax fingers to the funnel, the exposed wax surface of each finger and funnel was coated in an experiment V for facecoat (essentially 99% $Y_2O_3$ when dried) and while wet immediately after coating it was stuccoed with $-40+100$ mesh fused $Y_2O_3$. This was then allowed to dry.

The first coat applied to the wax finger is called the facecoat and the slurry compositions thereof are given in Tables 3 and 4 along with their viscosity readings during application of the coating, and the type of stucco refractory used on each finger experiment.

TABLE 3

| | Slurries | | | | | | | | | |
|---|---|---|---|---|---|---|---|---|---|---|
| Slurry Number | 398 | 404 | 405 | 406 | 407 | 408 | 409 | 410 | 411 | 412 |
| Latex, gms. | 66 | 10 | 10 | 8 | 10 | 6 | 6 | 6 | 6 | 6 |
| Sterox NJ, drops | 40 | 10 | 10 | 10 | 20 | 10 | 10 | 10 | 10 | 10 |
| 2-ethyl hexanol, drops | 60 | 30 | 30 | 30 | 40 | 30 | 30 | 30 | 30 | 30 |
| Glacial Acetic Acid, ml. | 39 | | | | | | | | | |
| Remasol SP-30, gms. | | | | | | | | | | |
| DI Water, gms. | | | | | | | | | | |
| Silester A-1, gms. | | | | | | | | | | |
| Remasil 60, RP 325, gms. | | | | | | | | | | |
| $ZrO_2$ sol, gms. | 660 | 100 | | 80 | | 60 | 60 | 60 | | |
| Yttria sol, gms. | | | 100 | | 100 | | | | 60 | 60 |
| Monoclinic $ZrO_2$, gms. | | 450 | | | 500 | | | | | |
| E.F. Stabilized $ZrO_2$, gms. | 8300 | | | | | | | | | 290 |
| Fused Yttrium oxide, gms. | | | 600 | 340 | | | | | | |
| 8-92 Fused $ZrO_2$, gms. | | | | | | 240 | | | | |
| 20-80 Fused $ZrO_2$, gms. | | | | | | | 240 | | | |
| 40-60 Fused $ZrO_2$, gms. | | | | | | | | 270 | 300 | |
| Slurry Viscosity, sec. | 20 | 19 | 18 | 20 | 22 | 20 | 20 | 20 | 20 | 20 |
| Experiment Designation | G | F | V | H | T | I | J | K | Y | U |
| Yttria stucco | | | X | X | X | X | X | X | X | X |
| Remasil 60 Stucco, | | | | | | | | | | |
| EF Stabilized $ZrO_2$ Stucco | X | X | | | | | | | | |

TABLE 4

| Slurry Number | 413 | 414 | 415 | 416 | 417 |
|---|---|---|---|---|---|
| Latex, gms. | 6 | 6 | | | |
| Sterox, NJ, drops | 10 | 10 | 10 | 10 | |
| 2-ethyl hexanol, drops | 30 | 30 | 30 | 30 | |
| Glacial Acetic Acid, ml. | | | | | |
| Remasol Sp 30, gms | | | 100 | 33.3 | |
| DI Water, gms. | | | | 66.7 | |
| Silester A-1, gms. | | | | | 1800 |
| Remasil 60, RP 325, gms. | | | | | 4500 |
| ZrO₂ Sol, gms. | | | | | |
| Yttria Sol, gms. | 60 | 60 | | | |
| Monoclinic ZrO₂, gms. | | | | | |
| EF Stabilized ZrO₂, gms. | | | 440 | 540 | |
| Fused Yttrium Oxide, gms. | | | | | |
| 8-92 Fused ZrO₂, gms. | 300 | | | | |
| 20-80 Fused ZrO₂, gms. | | 300 | | | |
| 40-60 Fused ZrO₂, gms. | | | | | |
| Slurry Viscosity, sec. | 20 | 21 | 22 | 20 | |
| Experiment Designation | W | X | BB | CC | |
| Stuccos: | | | | | |
| Yttria Stucco | X | X | | | |
| Remasil 60 Stucco | | | | | X |
| EF Stabilized ZrO₂ Stucco | | | X | X | |

In each of the facecoats a small amount of an acrylic vinyl latex was added to the slurry to aid in continuous film formation, better adhesion to the wax bar, and to prevent possible penetration of the silica binder to the mold surface during dipping of the backup coats. Several types of latex can be used if compatible with the slurry.

Finger samples H-2 and V-2 had two duplicate first-coats of slurry-stucco 405 and 405 respectively instead of one first coat (primary coat) for the other fingers.

The entire mold assemblies were then dipped into Slurry 417 and immediately stuccoed with Remasil 60 stucco, 70 mesh grain size. This coating was allowed to harden and recoated with the same slurry, stuccoing with a 50 mesh grain size. This was repeated until a total of seven coats had been applied to the wax pattern. The last coating was not stuccoed. After all coats were applied, the molds were allowed to dry thoroughly for several days before dewaxing, although a long dry time is not essential.

The molds were dewaxed in hot pure motor oil at about 130° C., and then preheated to 2500° F. to adequately bond the mold surface and allowed to cool until ready for casting.

The refractories and other materials used in preparing the slurries used in accordance with the invention are described as follows:

1. Vinyl-acrylic latex, a commerical product available from several sources; e.g. Air Products Co., used to provide improved film forming properties to the slurry and to prevent penetration of liquids from subsequent coats to the mold surface.
2. Sterox NJ a product of Monsanto Chemical Co. and is a low-foaming wetting agent.
3. 2-ethyl hexanol, a commercial chemical, used as a defoaming agent.
4. Zirconia sol, transparent in appearance, acetate stabilized, containing approximately 20% $ZrO_2$, pH 3.2, sold by Remet Corporation.
5. Yttria sol, containing approximately 14% $Y_2O_3$, pH approximately 7, transparent in appearance, sold by Remet Corporation.
6. Glacial acetic acid, a standard commercial product.
7. Monoclinic $ZrO_2$, 325 mesh, a commercial product of TAM Ceramics Corp.
8. Fused yttrium oxide, made by electrically fusing a 99.9% $Y_2O_3$ powder and grinding to 200 mesh powder showing 1.9%+200 mesh.
9. Fused 8-92 zirconium oxide made by fusing a mixture of 8% by weight of 99+% yttrium oxide and 92% by weight of a commercially pure grade of zirconium oxide. The fused product was ground to a nominal 200 mesh powder showing 4%+200 mesh.
10. Fused 20-80 zirconium oxide was made in a similar fashion to the 8-92 but containing 20% $Y_2O_3$. The fused product was ground to a −200 mesh size.
11. EF Stabilized $ZrO_2$ is a commercially available electrically fused calcia-stabilized zirconia having approximately 4% CaO as the stabilizer and is obtained from TAM Ceramics Corp.
12. Fused 40-60 zirconium oxide was made by electrically fusing a mixture of 40% of yttrium oxide of 99.9% purity with a 60% zirconium oxide of 99+% purity. The fused product was ground to a −200 mesh size.
13. Remasol SP-30, a commercially available aqueous colloidal silica sol from Remet Corporation, and containing nominally 30% $SiO_2$.
14. DI water is deionized water.
15. Silester A-1 is a commercial silica binder obtained from Remet Corporation and containing 20% $SiO_2$.
16. Remasil 60, RP 325 is a commercial aluminosilicate refractory powder, obtained from Remet Corp. containing a nominal 60% $Al_2O_3$.
17. Yttria stucco is the same product as 8. but −40+100 mesh particle size.
18. E.F. Stabilized Zirconia Stucco is the same product as 11. but −500+100 mesh particle size.
19. Remasil 60 stucco is the same product as 16. but of a nominal 70 mesh size for use on the first backup 417 slurry, and of a nominal 50 mesh size for use on the second and succeeding backup 417 slurries.

Prior to casting, one mold was heated to a temperature of 500° F. and its duplicate to 1000° F. at which time each mold was then cast under vacuum. The furnace used a cooled copper crucible with consumable electrode. Maximum metal temperature was approximately 1700° C. (3060° F.). The molds were cooled in a vacuum chamber, removed and examined.

After casting, the molds were cooled, fingers were cut off, sectioned, embedded in plastic and metallographically polished, etched to show up the alpha case, and examined microscopically for alpha case. The measurements of alpha case are noted in Tables 5 and 6.

TABLE 5

| THICKNESS OF "ALPHA CASE"-CAST SAMPLES MOLD TEMPERATURE - 1000° F. | | |
|---|---|---|
| Mold Number | Sample Designation | Case Depth " |
| 1 | I | .016–.022 |
| | G | .014–.018 |
| | K | .016–.018 |
| | F | .017–.018 |
| | H | To .0005 |
| | T | .014–.017 |
| | U | .010–.017 |
| | V | .0001" typical, isolated to .007 |
| | W | .015–.017 |
| | X | .014–.023 |

TABLE 6

THICKNESS OF "ALPHA CASE"-CAST SAMPLES MOLD TEMPERATURE - 1000° F.

| Mold Number | Sample Designation | Case Depth " |
|---|---|---|
| 3 | BB | .014–.018 |
| | V | .0001 |
| | V2 | .0001 |
| | I | .016–.017 |
| | CC | .017–.020 |
| | J | .015–.016 |
| | H | .0002 typical, isolated to .0007 |
| | H2 | .0001 typical, isolated to .0004 |
| | Y | .015–.018 |
| | V | Typical .0003, isolated to .009 |

As to alpha case measurements, the samples cast at 1000° F. mold temperature were measured accurately. This would represent the worst reaction condition. Looking at Table 5, there is very little difference in the spread of the alpha case on samples I, G, K, F, T, X. There appears to be more uniformity in sample W. Sample U on mold 2 appears to have potentially half the case in some areas than the other samples. Sample H on mold 1 with ytrria as the major surface constituent is very low in alpha case being less than 0.001". Sample V on mold 2 having greater than 99% ytrria as the mold surface was the best at 0.0001". The isolated 0.007" case point is probably related to the inconsistency of the process used in making the surface.

On Table 6, one notes samples V and V2 on mold 3 with slight variations in the process, having less than 0.0001" case. Sample V, mold 4, was very low in case but contained an isolated high spot attributed to process defect. Samples H and H2 with similar slight process variations also confirm previously low figures on mold 1. Samples BB and CC on mold 3 which contain some silica in the mold surface have approximately the same amount of case as some of the other experimental samples. On mold 4, there is a reconfirmation of results obtained on mold 1. In comparing depth of alpha case of 500° F. vs 1000° F. molds in general, the depth was less on the 500° F. and less intense. Samples H and V were essentially free of alpha case at both temperatures. Sample U was considerably lower on alpha case then the average.

From the above photomicrographs it appears that a casting mold surface having a major yttrium oxide content has considerably less reaction with titanium cast into such mold, producing extremely low alpha case.

Individual blends of ytrria sol were made with the following refractories; fused silica, zirconia and graphite, alumini, silicon carbide. All of these are classified in the art as being relatively "inactive refractories". The compositional details are set forth below: The yttria sol composition was about 14% $Y_2O_3$ at a pH of about 7 in water.

Relative to the proportions of refractory to be used with the yttrai sol, in the case of relatively "inactive" refractories such as monoclinic zirconia, tabular alumina, fused silica and zircon, these can vary widely depending upon their particle size distributions, the specific gravity of the refractory, the manner of processing such as injection molding, casting, pressing or dipping, and the application of the mix. In general, when slurries are made for dipping investment casting patterns with fused silica refractory flour of about 325 mesh, a ratio of one part flour to one part yttria sol is about the minimum. As much as two parts of refractory can be used to produce a thick slurry coat. A range of about two to five parts of monoclinic zirconia can be used. In the case of zircon and tabular alumina of similar particle size distributions a range of about two to four parts of flour to one part sol can be used. Variations in these proportions may be made depending upon the particular results desired. Other processes, such as injection molding, casting, etc. would require less sol with the refractory. Dry pressing would require still less sol to provide proper pressing consistency.

In the case of using "active" refractories with yttria sol, such as yttria-stabilized zirconia, fused yttrium oxide, fused yttria-zirconia, blends of yttrium oxide with other refractories, somewhat more sol may be required to prolong shelf life of the mix. Some of these refractories will "gel" the sol but by controlling the proportions the mixes may be processed satisfactorily before gelation. The ultimate gelation and hardening of the mix is advantageous in making refractory shapes.

It is further advantageous to bond refractory fibers with ytrria sol to produce high refractories. Such fibers include silicon carbide, silicon nitride, carbon fibers, alumina fibers and the like.

Many of the compositions produced from the ytrria sol-refractory fiber system may be used for special coatings and for casting shapes when a gelling agent or active refractory is used with the ytrria sol.

The separate slurries made with yttria sol and zircon, alumina and fused silica were deposited on a wax pattern and allowed to dry. The resulting coating was strong and resisted scrapping with a knife. Protective coatings may be applied to many types of surfaces such as ceramics, metals, foundry molds, and for electronic applications. For example, an yttria sol-fused yttria refractory powder slurry can be used to spray paint or coat a refractory melting crucible to minimize metal crucible reaction. It may also coat a pouring basin or ladle to minimize reaction. In particular, a thin surface layer may be sprayed on to a cope and drag foundry mold and dried to form a strong non-reactive coating for protection when reactive metals, such as titanium are poured into the mold. A single layer is usually sufficient to give good protection.

A preformed ceramic casting core suitable for casting molds for titanium casting was made by coating the inside of the core mold with a slurry composed of unfused yttrium oxide mixed with ytrria sol to a viscosity of about 20 seconds #4 Zahn cup. A few drops of a non-ionic wetting agent, Sterox NJ, were added to facilitate wetting of the mold surface. After coating and while the coating was wet, it was stuccoed with a −40+100 mesh fused yttrium oxide grain. The coating was allowed to dry at room temperature. After drying a heavy castable mix of a fused silica refractory of varying particle size distribution from 20 mesh and down and a prehydrolyzed ethyl silicate binder containing 20% $SiO_2$ and some ammonium carbonate gelling agent was added to the core mold with the above coating and the mix was allowed to gel. After gelation, the core was removed from the mold and found to have a smooth surface. It was then fired sufficiently high to bond both the coating and the cast backup to form a finished core ready for casting.

The refractory mix suitable for the bulk of the core may be any mix that will be compatible with the coating and is primarily used to provide a backing or support for the coating or core surface. The entire core material may be a hardenable mix made of yttria sol and a refractory. If titanium or other reactive metal is poured against the core, the refractory might be yttria. If the metal is less reactive than titanium, it may be alumina, zirconia or some other refractory.

Another ceramic cast shape was produced by mixing yttria sol with fused yttria refractory of −20 mesh size and poured into a shape around a test wax pattern and allowed to gel. The mold was quite hard and strong. The wax was melted out and the resulting mold heated to 2500° C. for one hour to bond the refractory. Commercial titanium was poured into the mold. The cast bar was cut, embedded and polished and examined for alpha case. FIG. 2 shows the relatively small layer of alpha case. This contrasts to a heavier layer in FIG. 1 which was cast into a similar mold having a zirconia sol bonded calcium stabilized zirconium oxide mold surface.

Figure 1:
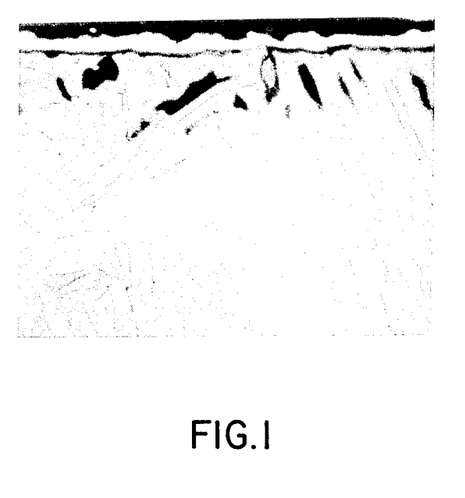
FIG. 1 is a photomicrograph of a cut section of a molded metal article exhibiting alpha case.
Figure 2:
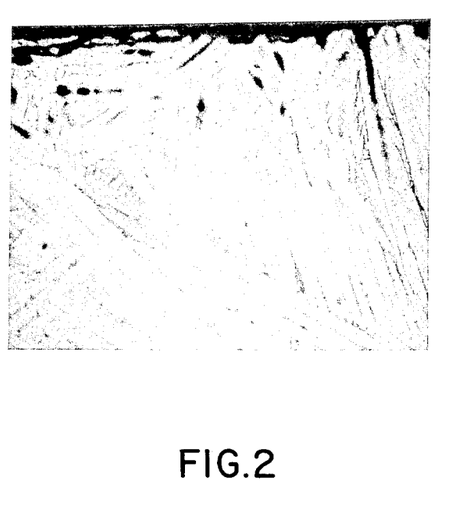
FIG. 2 is a photomicrograph of a cut section of a molded metal article exhibiting less alpha case than in FIG. 1.
Figure 3:
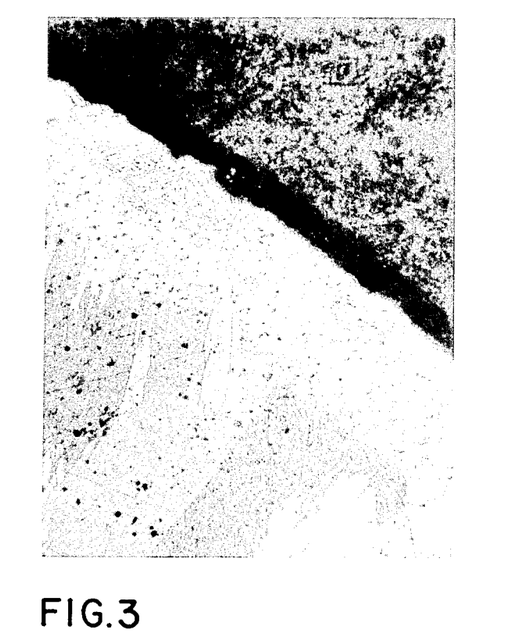
FIG. 3 shows representative alpha case on Sample G at 500° F. mold 1. All remaining photomicrographs are at 75X.
Figure 4:
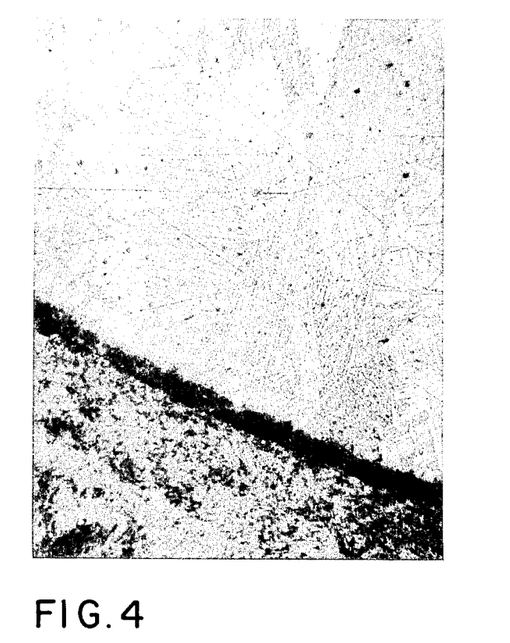
FIG. 4 shows lack of case on Sample H at 500° F. mold 1.
Figure 5:
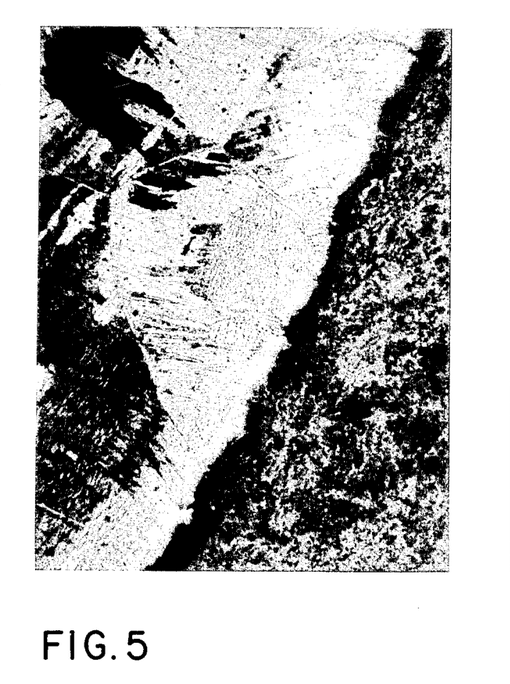
FIG. 5 shows the case on Sample T at 500° F. mold 2. For comparison.
Figure 6:
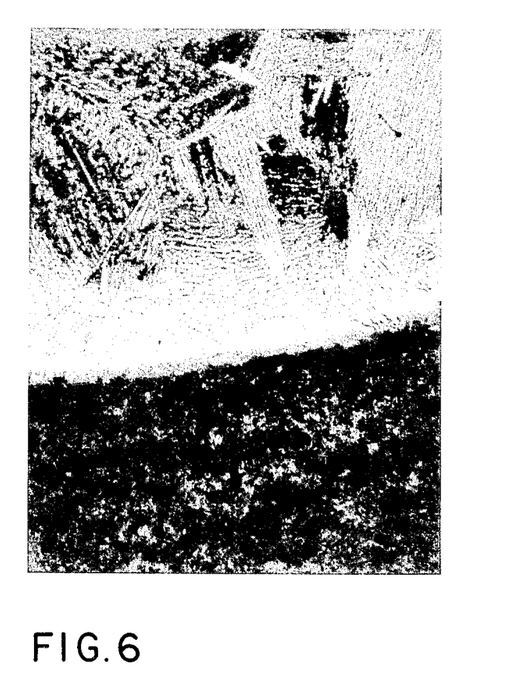
FIG. 6 shows the case on Sample T at 1000° F. mold 2, indicating thicker and more pronounced case.
Figure 7:
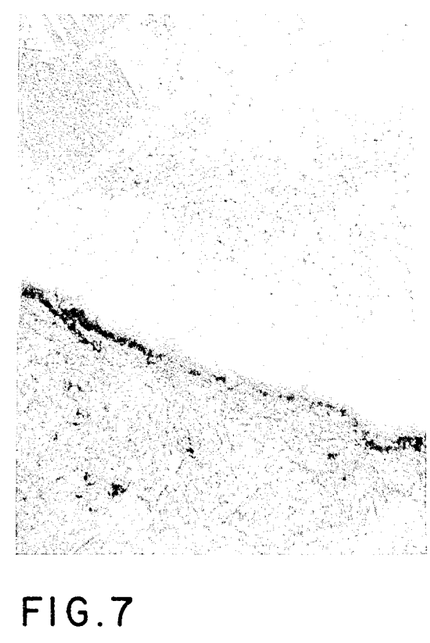
FIG. 7 shows the case of Sample X at 500° F. mold 2.
Figure 8:
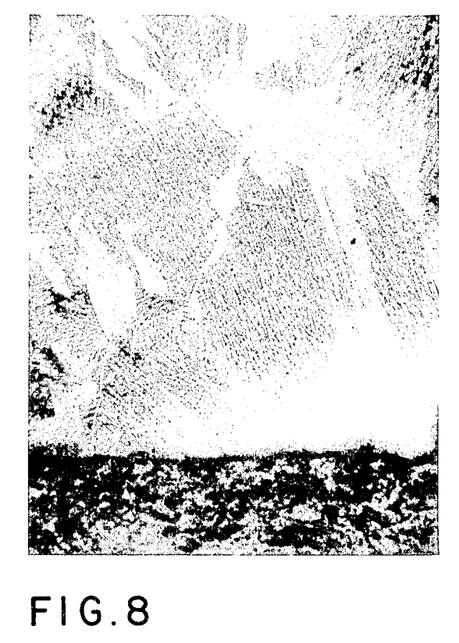
FIG. 8 is a photomicrograph of Sample U at 1000° F. mold 2. There is an isolated spot of alpha case and a large area without any case on the sample.
Figure 9:
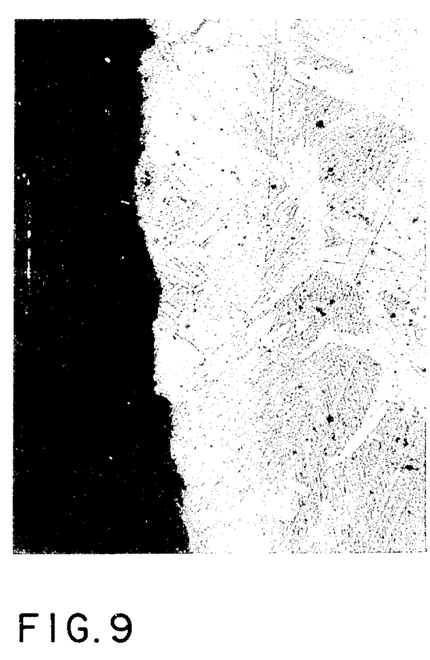
FIG. 9 shows the relatively faint alpha case area on Sample CC, mold 3 at 500° F. mold temperature. This contrasts with a more pronounced and wider case area on the same sample at a mold temperature of 1000° F., FIG. 10.
Figure 10:
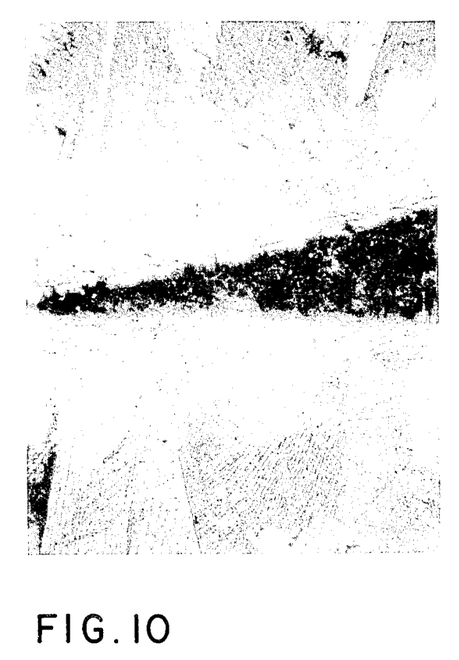
Figure 11:
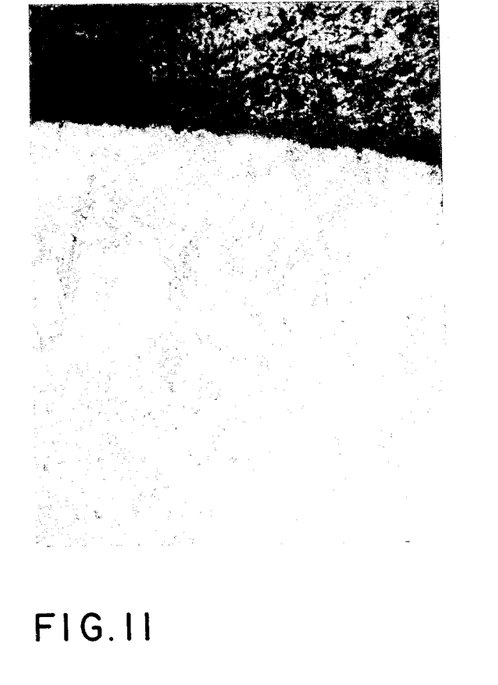
FIG. 11 shows no case on Sample V, mold 3 at 500° F. mold temperature. Similarly.
Figure 12:
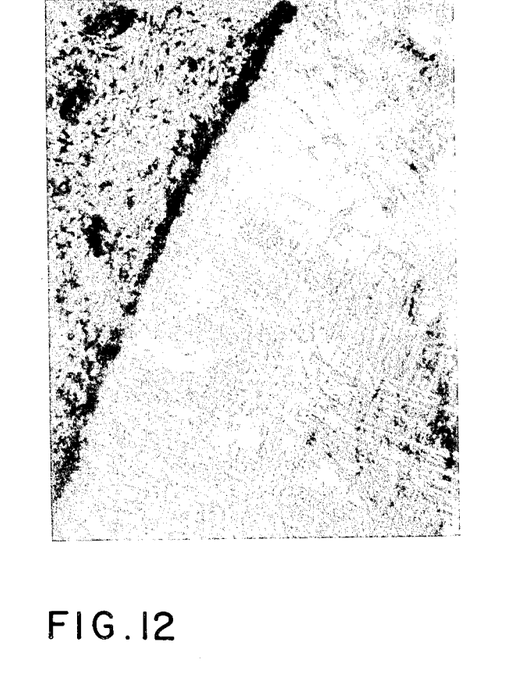
FIG. 12 shows no case on Sample V2, mold 3, at 500° F. mold temperature.

The casting shown in FIG. 1 was made in a shell mold with one test bar, the shell being made in accordance with the process described in Feagin, U.S. Pat. No. 4,504,591, column 6. Alpha case varied from about 0.010" to 0.050".

For FIG. 2, a wax test bar pattern similar to that used in making the casting referred to in FIG. 1 was used. Yttria sol was blended with yttria refractory of approximately 20 mesh and finer, with approximately 25% unfused yttrium oxide of −400 mesh and the balance −20 mesh fused yttrium oxide. A few drops of Sterox NJ wetting agent and 2-ethyl hexanol were added to the mix to improve wetting. The mix was deaired by vibration and poured around the wax pattern set within a cylinder to hold the cast refractory mix. The mix hardened within two hours. It was air dried for several days, fired to 1800° F. for 2 hours, cooled and then preheated to 800° F. and cast in commercial titanium. The alpha case was considerably less than that shown in FIG. 1.

A ceramic core suitable for reactive metal casting and particularly titanium can be made by making an yttria sol -yttria type refractory or other and casting or injection molding or pressing into a suitable mold and allowing the sol to gel. The gelled body can then be dried and fired and used as a casting core.

It has been found that yttria sol and zirconia sol are compatible. Therefore, it is possible to use a homogeneous blend of these two sols if desired rather than either sol alone.

Further variations and modifications will be apparent to those skilled in the art from a reading of the foregoing and are intended to be encompassed by the claims appended hereto.

I claim:

1. A composition comprising:
   zirconia sol as a binder, and a sufficient amount of a refractory material selected from the group consisting of:
   fused yttrium oxide, a fused mixture of yttrium oxide and zirconium oxide,
   a fused blend of zirconium oxide and yttrium oxide with an oxide of rare earth elements of the Periodic Table elements with an atomic member of 57–71;
   a fused blend of zirconium oxide with an oxide of rare earth elements of the Periodic Table of elements with an atomic number of 57–71;
   and a fused blend of yttrium oxide with an oxide of rare earth elements of the Periodic Table of elements with an atomic number of 57–71.

2. The composition as set forth in claim 1, wherein the zirconia sol is aqueous.

3. The composition as set forth in claim 1, further comprising said zirconia sol being about 20% $ZrO_2$ and stabilized with a pH of 3.0–3.7.

4. A coating made from a composition comprising a zirconia sol as a binder, and a sufficient amount of a refractory material selected from the group consisting of:
   fused yttrium oxide, a fused mixture of yttrium oxide and zirconium oxide,
   a fused blend of zirconium oxide and yttrium oxide with an oxide of rare earth elements of the Periodic Table elements with an atomic number of 57–71;
   a fused blend of zirconium oxide with an oxide of rare earth elements of the Periodic Table of elements with an atomic number of 57–71;
   and a fused blend of yttrium oxide with an oxide of rare earth elements of the Periodic Table of elements with an atomic number of 57–71.

5. The coating as set forth in claim 4, further comprising said zirconia sol being about 20% $ZrO_2$ and stabilized with a pH of 3.0–3.7.

6. A refractory shaped article made from a composition comprising zirconia sol as a binder and a sufficient amount of a refractory material selected from the group consisting of:
   fused yttrium oxide, a fused mixture of yttrium oxide and zirconium oxide,
   a fused blend of zirconium oxide and yttrium oxide with an oxide of rare earth elements of the Periodic Table elements with an atomic number of 57–71;
   a fused blend of zirconium oxide with an oxide of rare earth elements of the Periodic Table of elements with an atomic number of 57–71;
   and a fused blend of yttrium oxide with an oxide of rare earth elements of the Periodic Table of elements with an atomic number of 57–71.

7. The refractory shaped article as set forth in claim 6, further comprising said zirconia sol being about 20% $ZrO_2$ and acetate stabilize with a pH of 3.0-3.7.

8. The refractory shaped article according to claim 6 which is a mold.

9. A process for making an investment casting mold according to claim 6 having low reactivity with reactive metals comprising providing a sufficient amount of zirconia sol, mixing said sol with a refractory material from the group consisting of fused yttrium oxide, a fused mixture of yttrium oxide and zirconium oxide, a fused blend of zirconium oxide and yttrium oxide with an oxide of rare earth elements of the Periodic Table elements with an atomic number of 57-71;

a fused blend of zirconium oxide with an oxide of rare earth elements of the Periodic Table of elements with an atomic number of 57-71;

and a fused blend of yttrium oxide with an oxide of rare earth elements of the Periodic Table of elements with an atomic number of 57-71.

10. The process according to claim 9, further comprising applying to the coated pattern of at least one refractory material and thereafter sintering.

11. The process according to claim 10, further comprising applying a plurality of coatings of refractory material to said coated pattern.

12. A process for making a ceramic core comprising coating the inside of a core mold with a slurry comprising:

zirconia sol and a refractory material selected from the group consisting of yttrium oxide, fused yttrium oxide, a fused mixture of yttrium oxide and zirconium oxide, and a fused blend of zirconium and/or yttrium oxide with an oxide of a rare earth element of the Periodic Table of elements with an atomic number of 57 to 71, to thereby obtain a core mold with a coating on its inside, applying thereto finely divided refractory and permitting the coating to dry, thereafter applying to the coating a mixture of a refractory and a binder therefor, removing the core from the mold and firing said core at a sufficiently high temperature to bond the coating and the refractory.

* * * * *